(12) United States Patent
Dibble et al.

(10) Patent No.: US 11,015,136 B2
(45) Date of Patent: May 25, 2021

(54) SUPERCRITICAL WATER GASIFICATION WITH DECOUPLED PRESSURE AND HEAT TRANSFER MODULES

(71) Applicant: KING ABDULLAH UNIVERSITY OF SCIENCE AND TECHNOLOGY, Thuwal (SA)

(72) Inventors: Robert Dibble, Thuwal (SA); Kim Choon Ng, Thuwal (SA); Subram Maniam Sarathy, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 141 days.

(21) Appl. No.: 16/078,692

(22) PCT Filed: Mar. 10, 2017

(86) PCT No.: PCT/IB2017/051429
§ 371 (c)(1),
(2) Date: Aug. 22, 2018

(87) PCT Pub. No.: WO2017/153970
PCT Pub. Date: Sep. 14, 2017

(65) Prior Publication Data
US 2019/0062656 A1 Feb. 28, 2019

Related U.S. Application Data

(60) Provisional application No. 62/307,312, filed on Mar. 11, 2016.

(51) Int. Cl.
*C10J 3/78* (2006.01)
*C10J 3/86* (2006.01)

(52) U.S. Cl.
CPC . *C10J 3/78* (2013.01); *C10J 3/86* (2013.01); *C10J 2300/0979* (2013.01); *Y02P 20/54* (2015.11)

(58) Field of Classification Search
CPC .. C10J 2300/0979; C10J 3/78; C10J 2200/09; C10J 2200/15; C10J 2300/1246; C10J 2300/1861
See application file for complete search history.

(56) References Cited

U.S. PATENT DOCUMENTS

| 2004/0232046 A1* | 11/2004 | Tanaka | C01B 3/34 208/107 |
| 2007/0006528 A1* | 1/2007 | Diebold | C10J 3/26 48/197 R |

(Continued)

FOREIGN PATENT DOCUMENTS

| EP | 1489046 A1 | 12/2004 |
| WO | 2010070195 A2 | 6/2010 |
| WO | 2010134077 A2 | 11/2010 |

OTHER PUBLICATIONS

Dong, G., et al., "Study on the Phase Relation Between Ion Current Signal and Combustion Phase in an HCCI Combustion Engine," Proceedings of the Combustion Institute 35 (2015); Jan. 2014; pp. 3097-3105.

(Continued)

*Primary Examiner* — Imran Akram
(74) *Attorney, Agent, or Firm* — Patent Portfolio Builders PLLC (57) ABSTRACT

The present invention discloses a system and method for supercritical water gasification (SCWG) of biomass materials wherein the system includes a SCWG reactor and a plurality of heat exchangers located within a shared pressurized vessel, which decouples the function of containing high pressure from the high temperature function. The (Continued)

present invention allows the heat transfer function to be conducted independently from the pressure transfer function such that the system equipment can be designed and fabricated in manner that would support commercial scaled-up SCWG operations. By using heat exchangers coupled to the reactor in a series configuration, significant efficiencies are achieved by the present invention SCWG system over prior known SCWG systems.

14 Claims, 5 Drawing Sheets

(56) References Cited

U.S. PATENT DOCUMENTS

| | | | | |
|---|---|---|---|---|
| 2013/0199920 A1* | 8/2013 | Demir | ............... | C10J 3/62 201/16 |
| 2015/0159098 A1* | 6/2015 | Chen | ............... | F01K 13/00 252/373 |

OTHER PUBLICATIONS

López-Plaza, E.L, et al., "Experimental and Theoretical Study of the Energy Savings from Wet Ethanol Production and Utilization," Energy Technol., 2014, 2; May 2014; pp. 440-445.

Mack, H.J., et al., "Investigation of Biofuels from Microorganism Metabolism for Use as Anti-Knock Additives," Fuel 117; Jan. 2014; pp. 939-953.

Norwood, Z., et al., "Testing of the Katrix Rotary Lobe Expander for Distributed Concentrating Solar Combined Heat and Power Systems," Energy Science and Engineering 2014; 2(2); Jun. 2014; pp. 61-76.

Rapp, V.H., et al., "Research Octane Numbers of Primary and Mixed Alcohols from Biomass-Based Syngas"; Energy Fuels 2014, 28; Apr. 2014; pp. 3185-3191.

Saxena, S., et al., "Optimal Operating Conditions for Wet Ethanol in a HCCI Engine Using Exhaust Gas Heat Recovery," Applied Energy 116; Mar. 2014; pp. 269-277.

Van Blarigan, A., "Experimental Study of Methane Fuel Oxycombustion in a Spark-Ignited Engine," Journal of Energy Resources Technology, vol. 136; Mar. 2014; pp. 012203-1-012203-9.

Van Blarigan, A., et al., "Spark_Ignited Engine NOx Emissions in a Low-Nitrogen Oxycombustion Environment," Applied Energy 118; Apr. 2014; pp. 22-31.

Vuilleumier, D., et al., "Intermediate Temperature Heat Release in an HCCI Engine Fueled by Ethanol/n-Heptane Mixtures: An Experiment and Modeling Study," Combustion and Flame 161; Mar. 2014; pp. 680-695.

Wolk, B., et al., "Enhancement of Flame Development by Microwave-Assisted Spark Ignition in Constant Volume Combustion Chamber," Combustion and Flame 160; Mar. 4, 2013; pp. 1225-1234.

International Search Report in related International Application No. PCT/IB2017/051429, dated May 19, 2017.

Written Opinion of the International Searching Authority in related International Application No. PCT/IB2017/051429, dated May 19, 2017.

* cited by examiner

SUPERCRITICAL WATER GASIFICATION WITH DECOUPLED PRESSURE AND HEAT TRANSFER MODULES

RELATED APPLICATION DATA

This application is a U.S. National Stage of International Application No. PCT/IB2017/051429, which claims priority and the benefit of U.S. Provisional Patent Application Ser. No. 62/307,312, filed Mar. 11, 2016, the entire contents of which are incorporated herein by reference.

TECHNICAL FIELD

The present invention relates to a method and apparatuses for supercritical water gasification of biomass materials.

BACKGROUND OF THE INVENTION

The background of this invention will address biomass-derived energy, biomass gasification and supercritical water gasification (SCWG).

Biomass-Derived Heat Energy

Biomass is an energy source based on the use of organic matter derived from living (or once living) organisms, which is typically plant-based materials. Historically, biomass-derived energy has been sourced through burning wood or other materials to produce heat, and, for example, that heat source is used to make steam that turns generators to make electricity. This type of biomass-derived heat energy is used as a domestic energy source in many developing areas of the world.

Wood-based materials are historically the largest source of biomass energy and these wood-based materials include forest residues, such as trees and the like, wood chips, mill residues, pulp resulting from paper production, and other cellulose based industrial processes. Biomass is considered to be a renewable source of fuel that can produce energy because you can re-grow plant materials in the same soil that once maintained recently harvested biomass plant life.

Because biomass is primarily a plant-based energy source, plant-based waste materials are an unresolved problem with the production of biomass materials, and the generation and use of biomass energy. Producing heat energy by burning biomass fuels, or other types of fuels such as coal, produces a large amount of by-product carbon dioxide gas ($CO_2$) and other gases that are released into the atmosphere. These pollutants are a significant draw-back with the generation and use of biomass heat energy associated with burning of biomass materials. The research into the conversion of biomass into a fuel has not resulted in a satisfactory use or generation of biomass energy that can also eliminate or reduce $CO_2$ emissions from the biomass conversion.

Sugar cane and corn have been used to produce energy from biomass by the production of biofuels from plant sources. Sugars present in the sugar cane or corn have been fermented to produce bioethanol, which has been used in fuel cells to produce electricity. Biological approaches have also been developed that use yeasts and bacteria in fermentation of sugars extracted from wood to produce ethanol. Bioethanol produced from these methods has also been used predominately as an additive to petroleum-based fuels such as gasoline.

The practice of producing ethanol from cane and corn sugar is well established, but considered less than satisfactory and riddled with unresolved problems. Utilizing food-based plant resources for fuel production removes those food resources from the world's food production, which further aggravates existing food shortage problems. Additionally, bioethanol use does not lead to a meaningful reduction in the production of $CO_2$ and other gas pollutant byproducts because bioethanol is still part of a burning process to produce a biomass-derived heat energy source.

The practice of creating ethanol from wood, called "cellulosic ethanol," has also been used to produce energy from biomass. Cellulosic ethanol is a type of biofuel produced from lignocellulose, a material in plants that comprises much of the mass of plants. One advantage of producing ethanol from lignocellulose is the abundance of plant material available than can be utilized in the process. Cellulose is a readily available in most types of trees, bushes, grasses and other plants; and, therefore, the raw materials for cellulosic ethanol production are available in almost all parts of the world. As set forth above, bioethanol has been used in fuel cells to produce electricity, but has predominately been used as an additive to petroleum-based fuels such as gasoline.

While some reductions in $CO_2$ emissions can be achieved using cellulosic ethanol, the reduction in those by-product pollutants is not sufficient or satisfactory based on prior developments. Cellulosic materials also require a significant amount of pre-processing before being used to produce the base ethanol. Pretreatment of cellulose with acids or other chemicals has been required to make the sugars available for the fermentation process, which is time consuming and expensive. These and other production challenges prevent cellulosic ethanol from being a satisfactory biomass-derived energy source.

Biomass Gasification

Instead of producing ethanol from biomass material, systems and methods have been developed to gasify biomass materials to produce combustible gases that can be used to produce energy. The basic process for producing energy by a wood gasification method have been used in the past, such as when these processes experienced a brief revival during both world wars to supplement energy resources caused by shortages in petroleum-based fuels. Prior systems and methods used to gasify wood or other biomass materials have been widely abandoned because of the significant inefficiencies in the process that cannot be avoided or minimized. Those same inefficiencies have not been avoided by prior known biomass gasification processes and systems.

In addition to these historic methods of gasification, non-biological approaches have been used to create a high temperature gas phase reaction with very little oxygen added, which converts wood or biomass to $CO_2$ and $H_2$ by "gasification." These methods for gasification of wood and most biomasses is not just inefficient based on known prior technology, but these methods lead to the production of $CO_2$, $H_2$, sodium, potassium and a fraction of nuisance intermediate products collectively called "tars." CO in the reaction is converted to $CO_2$ and more $H_2$ via a water-gas shift reaction.

The presence of tars and alkali atoms in the process system require it to be typically removed ("cleaned" or "scrubbed") from the $CO_2$ and $H_2$ gases before the $H_2$ and $CO_2$ gases can be used in a combustion engine or synthesis reactors (where gasoline-like hydrocarbons and alcohols are synthesized), or otherwise released into the atmosphere. This "cleaning process" of the $CO_2$ and $H_2$ gases with "tars" as produced from gasified biomass materials is prohibitively expensive, and the "cleaning" equipment experiences a high failure rate due to corrosion and corrosive problems. Additionally, there is a significant amount of energy that must be input into the system to produce a useable biofuel from known prior biomass gasification systems due to these "cleaning process" steps, and the input energy requirements effectively negate any prior advantages that may be achieved from the use of biomass-derived energy in this system.

Supercritical Water Gasification (SCWG)

The use of super critical water gasification (SCWG) has been examined in the past to convert wood or biomass into $CO_2$ and $H_2$ gases. In a SCWG process, water (steam) is used to gasify biomass material instead of air as the "gasification" medium.

Generally, water exists in a liquid phase at ambient temperature and pressure, and with increasing temperature, water passes into a gaseous phase. Above a critical point (approximately 373° C. (646K) and 220 bars of pressure), distinct liquid and gas phases no longer exist because water and steam operate as a single phase called a "supercritical fluid." Depending on temperature and pressure conditions, the properties of this supercritical water fluctuate between the liquid and gas phases.

Supercritical water has the ability to dissolve substances like a liquid and effuse solids like a gas, and can be used advantageously to break down substances, including biomass materials. In some cases, excess $O_2$ may be used in SCWG processes, and the resulting processes is termed SCWGO or SCWO (with the O referring to the oxidation occurring therein). However, for ease of reference, hereinafter, SCWG and SCWGO will be collectively referred to as SCWG hereinafter.

Although quantitative conversion of wood to $CO_2$ and $H_2$ in a SCWG reactor has been experimented with in a laboratory hood and with a very small reactor diameter of 3 mm (⅛ inch), the scale up of the SCWG process into a mass-scale has proven to be problematic. The small-scale SCWG process developed and used in small-scale reactors has been shown to rapidly produce $CO_2$ and $H_2$ with less tars and alkali components, but these prior known SCWG processes and systems developed to date are not commercially viable.

At least two significant problems remain unresolved with the use of known prior SCWG processes in the production of biomass energy. These two unresolved problems include, one, excessive energy requirements (consumption) of energy during processing, and, two, excessive costs for energy production. First, a significant amount of energy is needed to raise the input materials to SCWG temperature and pressure conditions, which has proven to be prohibitive in the large-scale economical use of the system. Second, the prior known SCWG systems and methods involve high production equipment costs involved with the fabrication of the processing equipment and the transportation of suitable equipment to a plant location.

With respect to the first unresolved energy consumption problem, a slurry of incoming water (containing reactants) is raised from room temperature and pressure to a supercritical temperature and pressure. To illustrate the energy consumption problem, most slurries may include 20% wood and 80% water (e.g., 5 kg of slurry has 1 kg wood and 4 kg water), and a sample enthalpy balance for this scenario indicates that 5 kg of this slurry needs 15 MJ of heat to achieve SCWG supercritical conditions. Using a generally reasonable enthalpy of combustion of wood, it would take 1 kg of wood to generate 15 MJ of heat energy.

Under this analysis, 1 kg of wood would need to be consumed by combustion to raise 1 kg of wood in a slurry to supercritical temperatures and pressures. Essentially, there would not be a net positive energy production because all of the energy converted from 1 kg of wood in this slurry would need to be utilized (or more) to sufficiently heat up that slurry to the supercritical conditions. Viewed another way, all of the energy that could be produced from the $H_2$ produced from known prior SCWG processing systems and methods would be consumed, at least, by the amount of biomass that would need to be consumed by combustion to heat up the incoming slurry to the SCWG conditions, which yields a zero or negative net output of energy. That calculation does not account for the other inefficiencies in the system or other energy losses, which if added, would make the known SCWG processes negative net energy production systems and methods.

With respect to the second unresolved excessive cost issue, the prior known SCWG systems and methods involve extremely high production equipment costs for the equipment needed for processing, or alternatively, fabrication of the processing equipment and the transportation of suitable equipment to a plant location. Known SCWG reactors are typically fabricated from stainless steel, which is expensive, and are highly reinforced machines because the sustained temperatures (T) and pressures (P) are extremely high—above the critical point of water (T=373° C. and P=220 bars) must be achieved and maintained during the processing steps.

Chemical reactions in water at super critical pressure (P=>220 bar) and temperature (T=>373° C.) also occur, so reactors constructed to withstand those extreme conditions are typically formed of very thick stainless steel or Inconel alloy, which is very expensive. When considered in conjunction with additional fabrication and/or shipping costs, the overall expense of known SCWG equipment is often considered to be cost-prohibitive. There remains a need for an improved means of producing biomass-derived energy by an efficient, sustainable, and cost-effective process.

SUMMARY OF THE INVENTION

Provided herein is a system and method that addresses the problems that exist in the supercritical water gasification (SCWG) processing of biomass material, such as supporting SCWG gasification of biomass material in a more efficient and cost effective manner to support commercially useful scaled-up SCWG operations. The present invention discloses and claims systems and methods for supercritical water gasification (SCWG) of biomass materials using a SCWG reactor and a plurality of heat exchangers that are located within a shared pressurized vessel, which is a more energy efficient and cost effective SCWG process than has previously been known. In this manner, the present invention addresses the two primary problems that persist with prior SCWG processes, which are the excessive energy requirements (consumption) during the processing steps and the excessive costs of SCWG equipment involved with conversion of wood or biomass into $H_2$ and $CO_2$ gases.

The present invention includes a SCWG reactor and a plurality of heat exchangers within a shared pressurized vessel. A pressure vessel maintains the high pressure environment of the input material, the heat exchangers and the reactor, while the vessel can be maintained at low temperatures or even room temperature. The function of containing high pressure is decoupled from the high temperature function performed by the heat transfer exchangers. In this manner, the present invention allows the heat transfer function to be conducted independently from the pressure transfer.

Containing the heat from the hot fluid from the reactor in heat exchangers, which are all situated in a larger high pressure vessel, allows heat to be transferred to the incoming cooling liquid that is headed toward the reactor. This heat transfer allows much of the heat from the reactor to be recycled, which improves the efficiency of the present SCWG system over known prior SCWG systems. The present invention with a decoupled heat function from the pressure function allows use of a pressure vessel at lower or room temperatures, which in turn allows the use of lighter, less expensive equipment that is more compact than previously known. Thus, the present invention SCWG process can be used for converting larger quantities of wood and other biomass products than previously could be converted due to space, expense, and other considerations.

The separation of high pressure from high temperature functions in the present invention allows for less expensive components to be utilized than previously used in prior known SCWG operations. For example, component arrangements used in the present invention allows use of low-cost, room-temperature-rated, high-pressure tanks; low-cost heat exchangers; low-cost reactors; and combinations thereof. The lower equipment and operating costs of systems described herein allow SCWG operations to be commercially viable in many situations in which they previously were not.

In the present invention, the function of containing high pressure is decoupled from the high temperature function in the disclosed and claimed systems and methods. The present inventions includes a SCWG reactor and a plurality of heat exchangers located within a shared pressurized vessel. The shared pressure vessel will maintain the high pressure of the input material (slurry), but the vessel can be maintained at lower or room temperatures when it houses one or more heat exchangers that are coupled to an SCWG reactor, which allows the heat transfer function to be conducted independently from the pressure transfer function in the system. In this way, energy efficiency is increased and cost effectiveness is enhanced by the present invention in commercially useful scaled-up SCWG operation.

An apparatus for supercritical water gasification is disclosed herein having a pressure vessel having a wall separating an interior of the pressure vessel and an exterior of the pressure vessel; a reactor positioned within the interior of the pressure vessel, wherein the reactor is configured for super-critical water gasification of reactants to yield products; a supply path routed through the wall of the pressure vessel and to the reactor for providing reactants to the reactor from the exterior of the pressure vessel; an output path routed from the reactor and through the wall of the pressure vessel for providing products of super-critical water gasification from the reactor to the exterior of the pressure vessel; and one or more heat exchangers located within the interior of the pressure vessel, the one or more heat exchangers arranged and configured for transferring heat to reactants in the supply path from products in the output path, whereby heat is recycled from products and supplied to reactants en route to the reactor for super-critical water gasification processes, said apparatus configured to allow high temperature control to be decoupled from high pressure containment control.

The apparatus disclosed herein further comprises insulation positioned within the pressure vessel capable of maintaining an exterior of the pressure vessel at or near room temperature; and a reactant pump located along the supply path capable of increasing pressure of the reactants in the supply line from a pressure of 1 bar up to a pressure equal to or more than 220 bars. The apparatus disclosed herein further comprises an inlet routed through the wall of the pressure vessel to supply a pressurized buffer gas to the interior of the pressure vessel; an inlet routed through the wall of the pressure vessel to supply pressurized oxygen or air to the reactor inside the pressure vessel.

The apparatus disclosed herein further comprises further comprising a plurality of reactors (102), heat exchangers (104) or both reactors and heat exchangers positioned in parallel with one another, wherein heat exchangers for the apparatus are plate-type heat exchangers, shell-and-tube-type heat exchangers, or spiral-type heat exchangers, or combinations thereof. The reactor preferably used with the present invention is a full-scale production reactor that can produce commercially available quantities of $H_2$ and $CO_2$ gases for use in industrial production of energy.

The present invention includes a method for supercritical water gasification having the steps of: (a) providing reactants to be gasified in a reactor; (b) routing the reactants to the reactor; (c) routing the reactants through the reactor to subject the reactants to a super-critical water gasification process yielding products; and (d) routing the products from the reactor; wherein routing the products from the reactor and routing the reactants to the reactor comprises routing the reactants and products through one or more heat exchangers positioned within a room temperature pressure vessel to transfer heat from the products to the reactants; and wherein high temperature function is decoupled from high pressure function.

In the disclosed method, the reactants comprise a slurry of biomass and water and the reactants are pressurized prior to entering the reactor. The method disclosed herein further comprises routing a pressurized gas to the reactor, wherein the pressurized gas comprising oxygen, air or a combination of oxygen and air; routing a pressurized buffer gas to an interior of the pressure vessel, the pressurized buffer comprising nitrogen, air, or a combination of nitrogen and air. In the disclosed method, the reactor and one or more heat-exchangers are positioned in parallel in the interior of the pressure vessel, each of said heat exchangers capable of transferring the heat equivalent of 1-300° C. from the products to the reactants routed therethrough.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which.

While the invention is susceptible to various modifications and alternative forms, specific embodiments thereof have been shown by way of example in the drawings and are herein described in detail. It should be understood that the description herein of specific embodiments is not intended to limit the invention to the particular forms disclosed, but on the contrary, the intention is meant to cover all modifications, equivalents, and alternatives falling within the spirit and scope of the invention as defined by the appended claims. While the details of one or more embodiments are set forth in the description below, other features, objects, and advantages will be apparent from the figures, the description and from the claims.

DETAILED DESCRIPTION

As described herein, the present invention discloses a system and method for supercritical water gasification (SCWG) of biomass material. The present invention includes a SCWG reactor and heat exchangers located within a shared pressurized vessel, which means the function of containing high pressure is decoupled from the high temperature function. Put another way, the present invention allows the heat transfer function to be conducted independently from the pressure transfer. By decoupling these functions, the present apparatuses and methods achieves efficiencies and cost effectiveness over known SCWG systems, which allows the present invention to support commercial scaled-up SCWG operations.

Containing the heat from the hot fluid from the reactor in heat exchangers within the high pressure vessel allows heat to be transferred to the incoming cool liquid that is headed toward the reactor. This allows much of the heat from the reactor to be recycled, which increases efficiencies of the present SCWG invention over prior known SCWG processes. The present apparatuses and methods also decouples the heat function from the pressure function, which allows use of a pressure vessel maintained at lower, or even room, temperatures than previously used in prior known SCWG systems. This results in a more efficient, less energy consumptive system, and also allows for the use of lighter, less expensive equipment that takes up less space compared to equipment used in prior SCWG systems. The present invention SCWG process can be used to convert large quantities of wood and other biomass products that may not have previously been capable of being processed and converted due to space, expense, energy consumption, and other considerations.

The separation of high pressure from high temperature functions allow for less expensive, less robust and lower cost components to be utilized than previously used in prior SCWG operations. For example, arrangements herein allow use of low-cost, room-temperature-rated, high-pressure tanks; low-cost heat exchangers; low-cost reactors; and combinations thereof. The lower costs of equipment and the lower operating costs of systems described herein, along with the increased efficiency of the system, allow the present invention SCWG operations to be commercially viable in many situations in which they previously were not.

The heat exchangers remove heat from hot SCWG reactor products and recycle that heat into incoming reactants, which meant this heat exchange serves to recover energy invested into operation of the system. This heat exchange, when performed in series multiple times, increases the efficiency of the system tremendously over known prior SCWG systems. For example, counter current heat exchangers may be arranged so that the incoming reactants are heated by the outgoing hot products from a reactor that is in communication with both the incoming stream and the outgoing stream. A plurality of heat exchangers so arranged permits suitable pressure for SCGW (e.g., 220 bars) and have temperatures ranging from room temperature to the highest temperatures in the SCGW process (e.g., ranging from 20° C. to about 600° C. or higher).

In one example, a slurry of approximately 20% wood and 80% water, requires the application of 15 MJ net heat to raise 5 kg of slurry to supercritical SCWG conditions. When this material is then passed through heat exchangers in the present invention, there is a recovery of 80% of heat in the outgoing hot products. This recovered heat (e.g., 12 MJ) is transferred by the heat exchangers to incoming reactants, meaning that only 3 MJ/5 kg is required to be applied to the next 5 kg of incoming slurry, which is only 20% of that which would be needed to achieve SCWG conditions without using the present invention. The remaining 12 MJ of energy in the incoming slurry would increase the output efficiency of the system and make it more cost effective and energy efficient to produce 12 MJ worth of output $H_2$.

Figure 1:
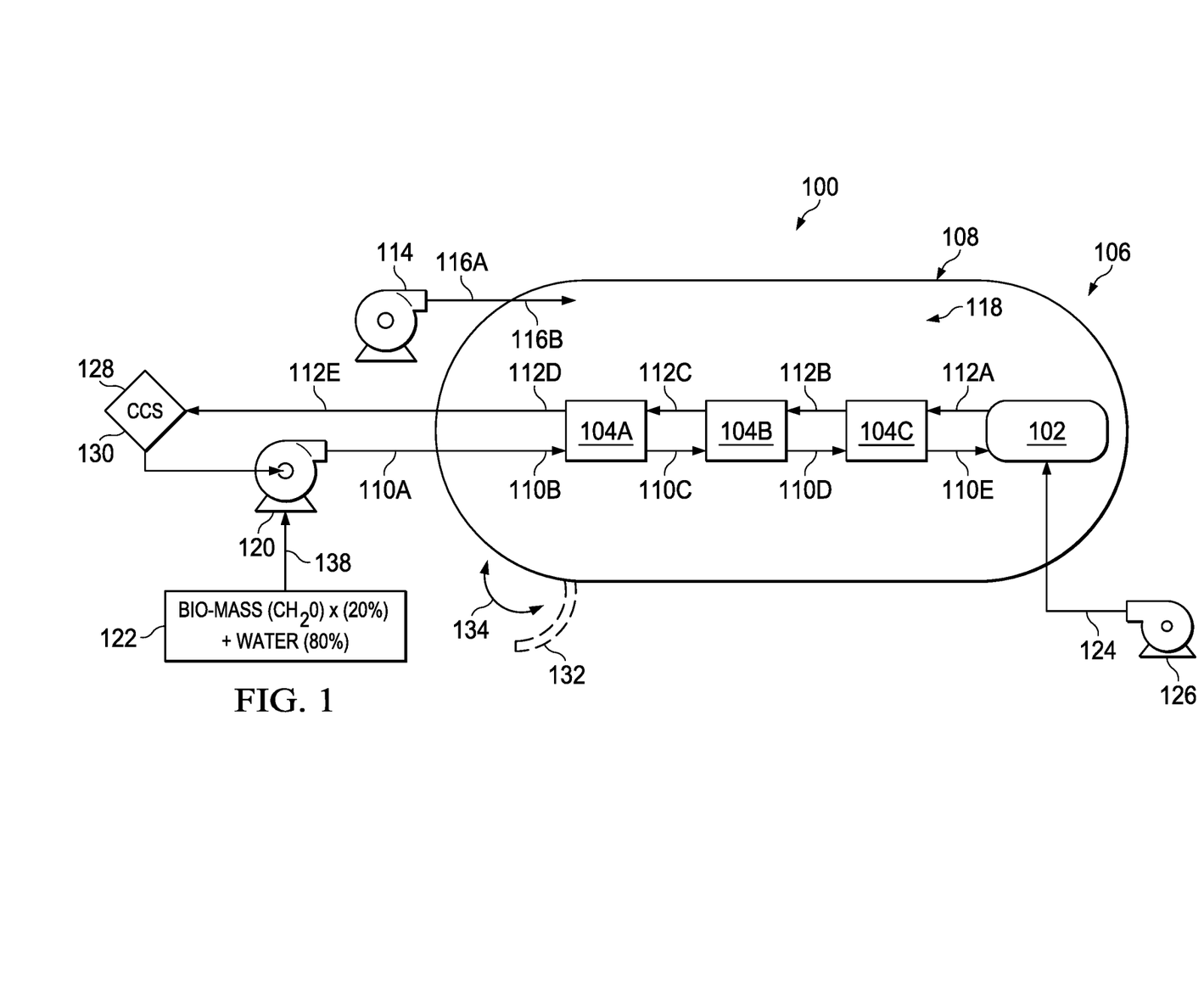
FIG. 1 is a schematic illustration of a system for SCWG operations in accordance with certain embodiments.

Referring now to the figures, FIG. 1 shows a schematic illustration of a system 100 for SCWG operations. The system 100 shown in FIG. 1 includes a reactor 102 and one or more heat exchangers 104 (individually labeled as 104A, 104B, and 104C). The reactor 102 and the heat exchangers 104 are optionally located within a shared pressure vessel 106. This arrangement facilitates recycling of heat to improve efficiency of operations in the system 100. Provision of both the reactor 102 and the heat exchangers 104 within the shared pressure vessel 106 also has the effect of decoupling a function of containing heat and a function of containing pressure, thereby permitting benefits discussed herein. The reactor preferably used with the present invention is a full-scale production reactor that can produce commercially available quantities of $H_2$ and $CO_2$ gases for use in industrial production of energy.

The pressure vessel 106 (hereinafter tank 106) optionally includes a tank wall 108, which separates an interior of the tank 106 from an exterior of the tank 106. The tank wall 108 is optionally configured to maintain a difference in pressure between the interior and exterior of the tank 106. In some embodiments, the tank 106 corresponds to a commercially available tank, such as a scuba tank or a tank fabricated for containing natural gas. Many such commercially available tanks safely contain pressures exceeding 200 bars or other suitable pressures for SCWG processes. Suitable materials for the tank wall 108 include steel, titanium, or carbon fiber. Other tank materials are possible and considered within the scope of this disclosure. In one example, the tank 106 has a diameter of approximately 6 inches. This example is a size used for initial testing purposes and is generally the size of a scuba tank. However, in another example, the size of the tank is up-scaled. For example, the tank may have a diameter of 6 inches, 10 inches, 15 inches, 20 inches, 25 inches, 30 inches, 35 inches, or 40 inches or more, inclusive of any options in between. Other diameters can also be used. The length of the tank may be any appropriate range. For example, it may be a short as less than 1 foot or a few feet long, as long as the length is sufficient to house one or more heat exchangers and insulation. In alternative embodiment, the tank may be up to 40 feet in length or more, or may be 20-40 feet in length. Other lengths can also be used within the scope of this disclosure. For example, the system can be scaled up or down in size to include one or a plurality of small tanks or large tanks. The plurality of tanks optionally includes tanks of similar size or varying sizes. The plurality of tanks optionally are in in parallel with one another. The tank wall thickness can range from 1 mil thickness to 50 mil thickness, with a preferred thickness of 1 mil to 40 mil.

As shown in the embodiment of FIG. 1, the tank wall 108 optionally includes one or more penetrating structures. These structures allow materials to be delivered into and away from the tank. The number of penetrating structures can be varied. For example, the tank wall 108 in FIG. 1 is penetrated by a supply path 110, an output path 112, a buffer gas path 116, and an oxygen path 124. The supply path 110, output path 112, buffer gas path 116 and oxygen path 124 are configured to operate with pressures up to and exceeding 220 bars for the liquids or gases carried therein. Although these penetration points are shown at distinct locations along the tank wall 108 in FIG. 1, these penetration points can be grouped, combined, distributed, or arranged otherwise than shown. As one example, all of the penetration points of the tank can be incorporated at one location for passage of any and all constituent materials or substances into or out of the tank 106. The penetrating structures can be coupled with the tank 106 in such a manner that the tank 106 maintains a pressure difference between an interior and exterior of the tank 106.

The reactor 102 is configured for SCWG operations. For example, the reactor 102 is designed for operation at temperatures and pressures conducive to SCWG reactions. At high temperatures, residence times in the reactor are reduced and thus the size of the reactor can be smaller, resulting in less capital cost and higher reactor throughput. The reactor preferably used with the present invention is a full-scale production reactor that can produce commercially available quantities of $H_2$ and $CO_2$ gases for use in industrial production of energy. CO in the reaction is converted to $CO_2$ and more $H_2$ via a water-gas shift reaction.

The reactor 102 receives reactants, for example, along a supply path 110 (shown in FIG. 1, including supply path segments 110A, 110B, 110C, 110D, and 110E). Reactants enter tank 106 through the supply path 110 under pressure sufficient for the SCWG, generally around 220 bars. Within the reactor 102, the reactants form a reaction mixture in the reactor which undergoes the SCWG process and is converted into a product stream that is different from the reaction mixture. The reactor 102 is in communication with an output path 112 (shown in FIG. 1, including output path segments 112A, 112B, 112C, 112D, and 112E). The output path 112 carries an outflow of products of the SCWG process away from the reactor 102. Products exit the output path 112 still under pressure of around 220 bars.

Although reactants described herein primarily focus on wood (e.g., sawdust) or other biomass, other types of reactants can additionally or alternatively be used in system 100. As non-limiting examples, SCWG can be used for destruction of toxic wastes, explosives, septic or animal waste, organic waste or byproducts, and/or chemical-biological warfare agents, or any other appropriate wastes or materials. As one specific illustrative example, SCWG can be used to convert input from a waste water treatment plant (WWTP) or sewage plant into $CO_2$ and $H_2$.

Such a SCWG reactor replaces or supplements the anaerobic digesters currently used throughout the world. Such anaerobic digesters need large areas of land. Despite the large tanks ("digesters") and related equipment, however, only about 50% of the input biomass is converted to methane and $CO_2$. The remaining biomass (often termed "sludge") is typically collected into large bricks that are trucked to landfills to be buried. With the SCWG process, substantially all of the biomass is instead treated. Such conversion of biomass to $H_2$ reduces $CO_2$ addition to the atmosphere.

In addition to disposal of human-generated "waste water," SCWG can be an effective solution to not only dispose of cow manure, pig manure, chicken manure, or other livestock waste, but also to generate usable fuel from such waste (e.g., $CO_2$ neutral fuel such as $H_2$). It is also possible to use the systems disclosed herein to treat olive pomace (e.g., skins and pulp) that are waste products from extraction of olive oil and the like, as the systems described herein are useful for recycling end by-products. Treating biomass accordingly reduces or eliminates pathogens or other chemicals that may be present in the waste water, waste material, or by-products and can produce usable new end products, such as alternative fuel.

The reactor 102 can be started or initiated in any suitable manner. In some embodiments, the reactor 102 may include resistive or other electrical heaters to provide sufficient heat for starting up the reactor 102. Optionally, a supply of heated oxygen, air, or a combination of oxygen and air, (such as along the oxygen path 124 provided by an oxygen pump 126 and/or other source of pressure such as a pressurized canister) is used to provide heat for starting the reactor 102.

The one or more heat exchangers 104A-104C are optionally arranged to transfer heat between the output path 112 and the supply path 110. Any suitable form of heat exchanger 104 can be utilized, including, but not limited to, particular options shown and described elsewhere herein, for example, with respect to plate-type heat exchangers, shell and tube heat exchangers and spiral heat exchangers shown in FIGS. 3-6.

The heat exchangers generally change the temperature of liquid or material running therethrough by up to 200-300° C. Providing one or more heat exchangers allows the system to handle temperatures well above the capability of a single heat exchanger. This allows the use of a plurality of less expensive and/or lighter heat exchangers, rather than requiring a single heat exchanger that can handle the entire temperature change required. Moreover, although three heat exchangers 104A-C are shown in FIG. 1, several heat exchangers can be coupled together including two, three, four, five, six, seven, eight, nine, ten, or more than ten heat exchangers can additionally or alternatively be utilized. Preferably, two to twenty heat exchangers can be coupled together, with the preferred range of 2 to 12 heat exchangers being coupled together in the vessel.

As noted above, the tank 106 may be penetrated by a buffer gas path 116. For example, a first buffer gas path segment 116A is located outside the tank wall 108 and a second buffer gas path segment 116B is located inside of the tank wall 108. The buffer gas path 116 can be in communication with a suitable buffer gas source 114, which optionally includes or is coupled with a suitable pump for movement of buffer gases. Suitable buffer gases are any inert or non-flammable gases that are capable of functioning as insulating agents in the interior of the pressurized tank and will not react with the system components. Suitable buffer gases include, but are not limited to, nitrogen, air, helium, neon, argon, or combinations thereof. Preferred buffer are nitrogen, air, or combinations of nitrogen and air. In various examples, the buffer gas supplied into the interior of the tank 106 acts as an insulation 118 for the heat exchangers 104 or the reactor 102.

Insulation 118 is optionally provided within and around the one or more heat exchangers 104 in the pressure vessel/tank 106. This insulation helps manage the heat generated and helps maintain the outside of the tank 106 at room temperature. Any suitable form of insulation 118 (or combinations thereof) can be utilized to reduce an amount of heat that travels from the reactor 102 (which may be as high as 600° C.) and/or heat exchangers 104 to the tank wall 108.

Suitable forms of insulation 118 include, but are not limited to, buffer gases described above, asbestos, fibers, fiberglass, cement-like insulation material, rock wool, polystyrene foam, urethane foam, vermiculite, perlite, reinforced carbon-carbon composite, silica fiber, cork, or cellulose. Such insulation 118 facilitates use of a tank 106 optionally not rated or designed for high temperatures. The thickness of the insulation can range from 0.5 mil of high grade insulation with a high R value to 55 mil thickness of insulation with a high R value.

For example, the tank 106 may be formed with a tank wall 108 that is thinner than if the tank 106 were rated to contain the heat by itself (as is often done in other SCWG systems). This allows for more cost-effective alternatives of tanks 106 to be utilized in the system 100 in comparison to other SCWG systems. For example, the tank wall 108 optionally has a thickness of 1/16 inches, in contrast to a corresponding wall thickness of 4 inches in an example SCWG system that does not implement features of the present disclosure.

An example sequence of operations of system 100 follow. A slurry 122 of biomass and water are introduced by a path 138 into the supply path 110. Optionally, the slurry 122 is premixed or generated by introducing appropriate amounts of reactants into water that may already be flowing or otherwise present in the supply path 110. The slurry 122 alternatively may be mixed separately in a mixing tank before introduction into the supply path 110. The slurry 122 can be propelled through the supply path 110 by any suitable pressure source, for example, by a reactant pump 120 illustrated schematically in FIG. 1. In one illustrative example, the reactant pump 120 is capable of raising a pressure of the slurry from one bar up to 220 bars or beyond to facilitate conditions for SCWG.

The slurry 122 can be propelled through a first supply path segment 110A outside the tank wall 108, through a second supply path segment 110B inside the tank wall 108, through the first heat exchanger 104A, through a third supply path segment 110C, and so on, to reach the reactor 102. With each passage through another heat exchanger 104, the reactants moving along the supply path 110 can receive heat through the heat exchanger 104, for example, from the output path 112. In this way, the reactants in the slurry progressively increase in temperature toward sufficient temperatures for the SCWG process as the slurry moves along the supply path 110. This progressive increase reduces the amount of energy transfer to the slurry needed within the reactor 102 to accomplish SCWG reactions and provides corresponding gains in efficiency of the system 100.

Oxygen and/or air can be provided along the oxygen path 124 to the reactor 102, for example, under the influence of an oxygen pump 126 that pressurizes the oxygen or air to 220 bars or other suitable pressure level for SCWG. The slurry 122 is provided to the reactor 102, such as through the supply path 110 under pressure of approximately 220 bars or other pressure level sufficient for SCWG. The slurry 122 spends a selected residence time within the reactor 102 under conditions to accomplish the SCWG process, and the resulting composition (the product stream) passes out of the reactor 102 into the first output path segment 112A, for example. The selected residence time can range from 5 minutes to several hours, and can preferably range from 5 minutes to 2 hours.

The product stream comprises a different chemical composition than the fluid entering the reactor 102 as the reaction mixture through the fifth supply path segment 110E. In this way, the reaction mixture enters the reactor 102 from the supply path 110 carrying reactants for the SCWG process and exits the reactor 102 into the output path 112 as the product stream carrying products of the SCWG process. The product stream exiting the reactor is at an elevated temperature and is still under pressure of around 220 bars. The reactor preferably used with the present invention is a full-scale production reactor that can produce commercially available quantities of $H_2$ and $CO_2$ gases for use in industrial production of energy.

Figure 2:
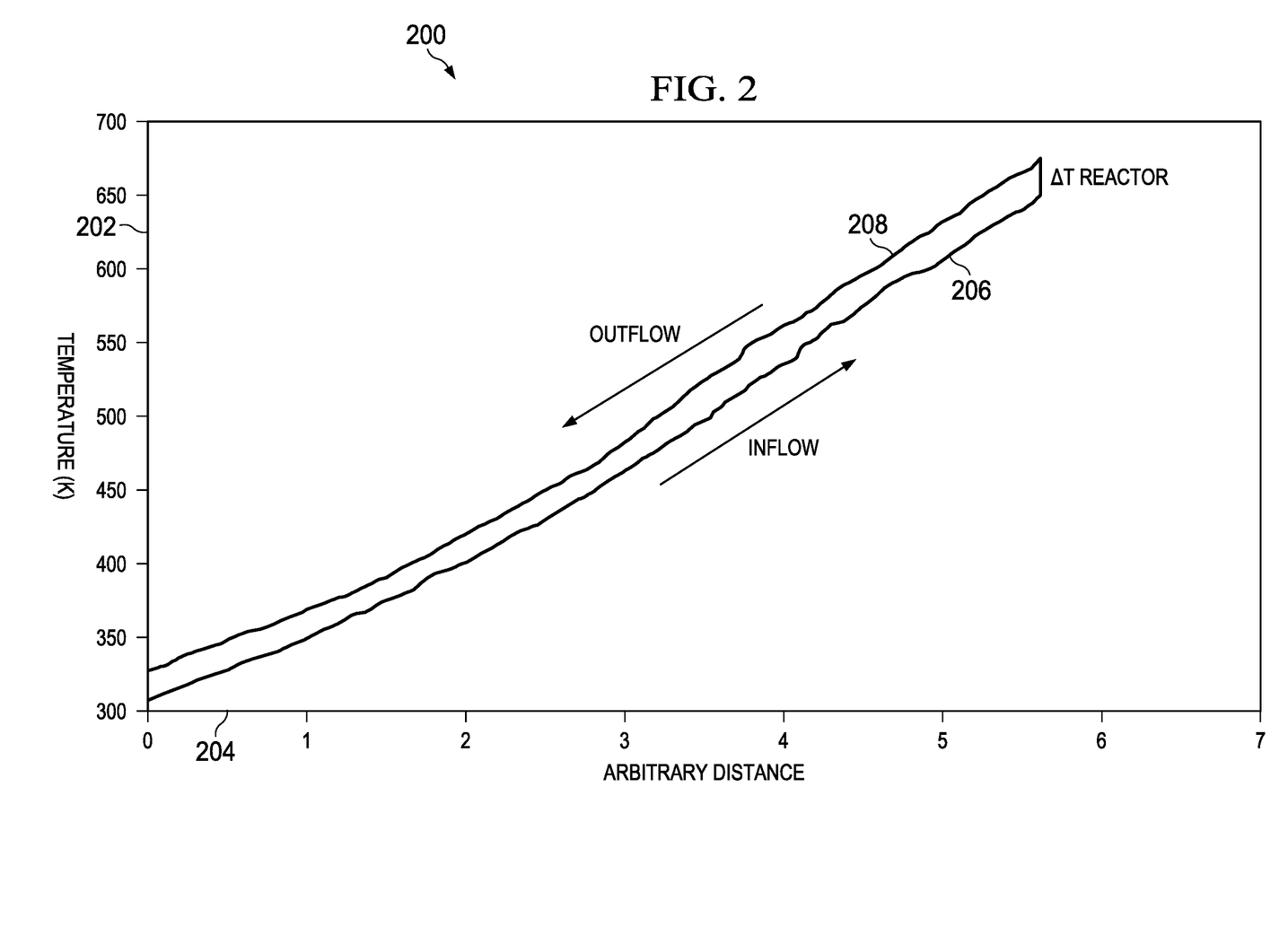
FIG. 2 is a graph illustrating temperature of inflow and outflow fluids as a function of position inside the tank portion of FIG. 1

The graph 200 in FIG. 2 illustrates temperature 202 as a function of position 204 inside the tank 106 according to one illustrative example of operation through the system 100. Fluid outflow exiting the reactor 102 can have a higher temperature 208 than the fluid inflow 206 entering the reactor 102. For example, in the specific embodiment illustrated in the graph 200, the fluid inflow temperature 206 entering the system is relatively low, such as slightly more than normal room temperature (~300K on the graph), and increases in temperature as it travels through the heat exchangers 104 and the reactor 102 to 600K or more.

The fluid outflow temperature 208 following residence time in the reactor 102 is high (600K or more) and decreases as it travels from the reactor 102 through the heat exchangers (104) to around 325K (~52° C.) when exiting the tank. In the example illustrated in the graph 200, the change in temperature ($\Delta T$) relative to the reactor 102 between fluid inflow temperature 206 and fluid outflow temperature 208 is approximately 75° C. However, the reactor 102 may change the temperature of fluid by other amounts, e.g., by amounts as low as 25° C. or to as high as 600° C. (~875K). Graph 200 is illustrative of this example only, and other temperature ranges, both higher and lower, would be experienced depending on the SCWG conditions for a specific application, for example, if more or fewer heat exchangers are included in the system. Preferably, two to twenty heat exchangers can be coupled together, with the preferred range of 2 to 12 heat exchangers being coupled together in the vessel.

The difference in fluid temperature between entry and exit relative to the reactor 102 can facilitate heat transfer through the heat exchangers 104. For example, as the fluid flows out through the output path 112, it can discharge heat to the incoming supply path 110 through the heat exchangers 104. This transfer can cool the fluid as it flows through the output path 112 and heats the fluid that flows through the supply path 110. In some aspects, each heat exchanger may provide a change in temperature of fluid flowing therethrough of up to or beyond 100° C. (~273K).

Thus, in an example flow illustrated by FIG. 1, fluid optionally enters the first supply path segment 110A at near room temperature (e.g., at 300K) and passes inside the tank wall 108 through the second supply path segment 110B into the first heat exchanger 104A. During passage through the first heat exchanger 104A, the incoming fluid in the supply path 110 receives sufficient heat from outgoing fluid in the output path 112 to cause the incoming fluid to reach a temperature of 375K, for example, when moving into the third supply path segment 110C.

Similarly, upon travel through the second heat exchanger 104B shown in FIG. 2, the fluid in the supply path 110 is approximately 450K, for example, when flowing into the fourth supply path segment 110D. From there, having flowed through the third heat exchanger 104C, the fluid in the fifth supply path segment 110E reaches 575K, for example, and needs very little additional heat in the reactor 102 to reach suitable conditions for SCWG. Continuing this example flow, fluid flowing out of the reactor 102 is approximately 675K, for example, after spending a suitable amount of residence time in the reactor 102 to accomplish SCWG processes. The selected residence time ranges from 5 minutes to several hours, and can preferably range from 5 minutes to 2 hours.

Upon travel through the third heat exchanger 104C, e.g., from right to left in FIG. 1, the fluid in the second output path segment 112B is approximately 500K upon discharging heat into the fluid entering from the fourth supply path segment 110D. Further passage through the second heat exchanger 104B causes the output fluid to be approximately 400K upon reaching the third output path segment 112C (e.g., due to transferring heat to additional fluid flowing in through the opposite side of the second heat exchanger 104B). Upon traveling through the final heat exchanger (i.e., first heat exchanger 104A), fluid in the fourth output path segment 112D has a temperature of 325K, for example, when passing through the tank wall 108 and into the fifth output path segment 112E.

This heat transfer results in the fluid coming out of the tank 106 at approximately 25K above the room temperature fluid flowing into the tank 106. In other examples, the differences in temperature between fluid entering and exiting the tank 106 may be larger or smaller, for example, as low as 10° C. difference or as high as 100° C. or more.

Once outside of the pressure vessel, the fluid can be routed to other post-processing components, facilities, or systems. CO in the reaction is converted to $CO_2$ and more $H_2$ via a water-gas shift reaction. A carbon capture sequestration ("CCS") system 128 is utilized to filter out $CO_2$, $H_2$, and/or dissolved salts from the fluid, e.g., leaving water that is recycled (e.g., at 130) for further use in the supply path 110 or other mixing apparatus for producing the slurry 122. The slurry 122 (added via path 138) and the recycled water 130 from the CCS system 128 may be propelled by the reactant pump 120 along the supply path 110A toward the tank 106.

In various embodiments, the tank wall 108 can include a flange 132, hinge, or other feature that allows the tank 106 to be operable or otherwise provide access to the inside of tank. The flange 132 allows a portion of the tank 106 to be removable to provide access to the interior of the tank 106. The flange 132 allows a portion of the tank 106 to be opened or closed (e.g., as illustrated by arrow 134) or otherwise moved. This access permits installation, maintenance, or replacement of parts within the tank 106. For example, cleaning of the heat exchangers or components thereof is permitted. The tank wall thickness can range from 1 mil thickness to 50 mil thickness, with a preferred thickness of 1 mil to 40 mil.

As noted above, various types of heat exchangers 104 can be used in the system 100. For example, commercially available (e.g., "off-the-shelf") heat exchangers or associated components may be used to take advantage of cost reductions associated with mass-produced components. However, customized heat exchangers 104 may also be used. In some embodiments, heat exchangers 104 with thin walls may be utilized to reduce overall cost of materials or to improve heat transfer in operation system 100.

Figure 3:
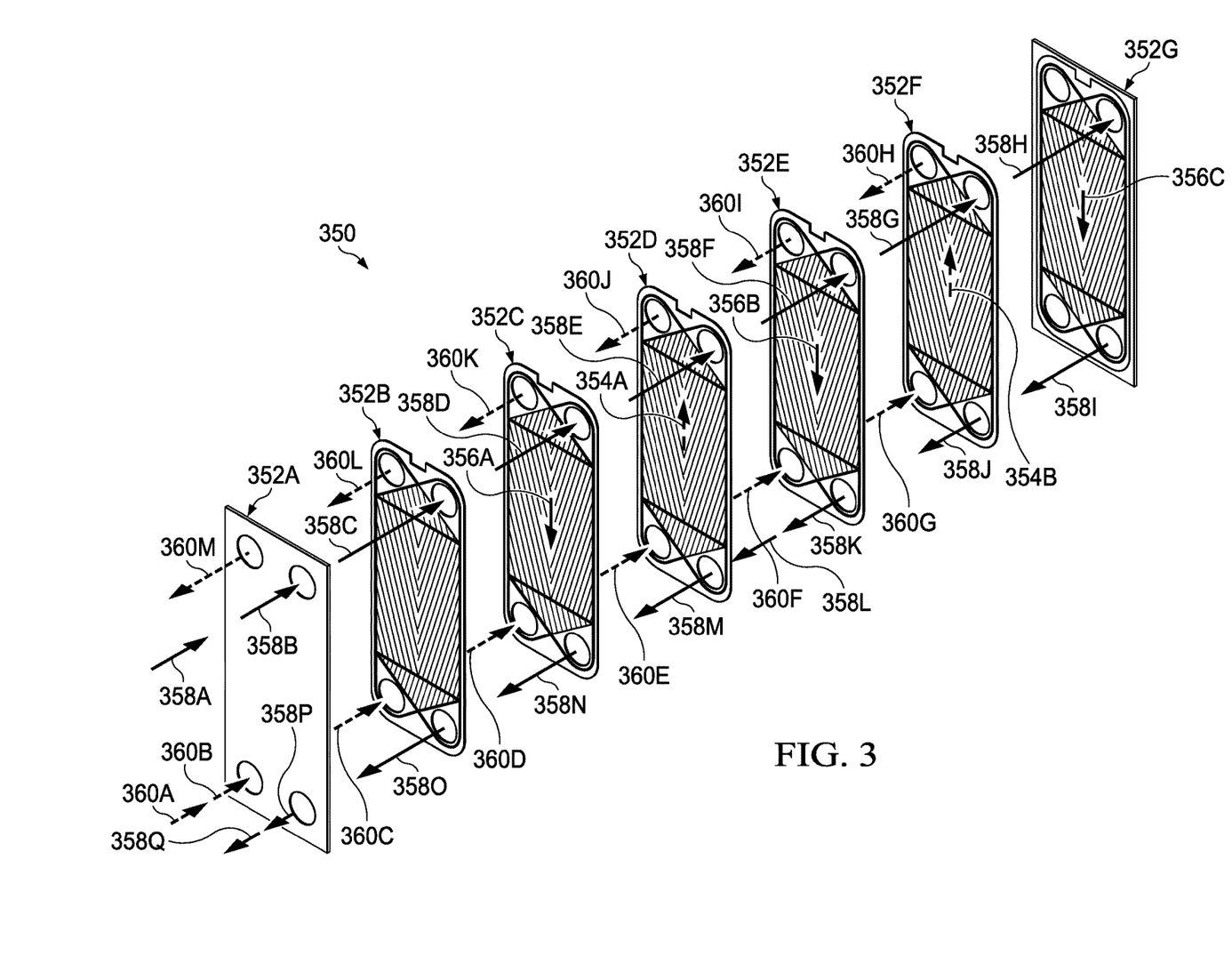
FIG. 3 is an exploded perspective view of a plate-type heat exchanger that may be utilized in the system of FIG. 1 in accordance with certain embodiments.

FIG. 3 illustrates one example of a plate-type heat exchanger 350 used in the system 100. The heat exchanger 350 can include a series of plates 352 (individually labeled as plates 352A-352G in FIG. 3). Such heat exchangers 350 optionally have large surface areas for greater heat transfer in a given volume in comparison to some other types of heat exchangers. The number of plates 352 utilized in the plate-type heat exchanger can be increased or decreased depending on the specific application.

For example, a flow of cool fluid (e.g., from the supply path 110) flows into the heat exchanger 350 along path 358A-358H, flowing downward along 354A-354C, and flowing out of the heat exchanger 350 along path 358I-358Q. The cool inflow fluid increases in temperature as the fluid flows along the path 358A-358Q. A flow of hot or warm fluid (e.g., from the output path 112) flows into the heat exchanger 350 along path 360A-360F, upward along 356A and 356B, then out of the heat exchanger 350 along 360G-360M. The warm outflow fluid decreases in temperature as the fluid flows along the path 360A-360M. The flow rate can preferably range from 1 L/min. to 500 L/min. depending on the size of the reactor, with one possible preferred range of 5 L/min. to 125 L/min.

The inflow and outflow fluids may be directed along opposite sides of a particular plate, for example 352D, to facilitate heat transfer across the significant surface area of the plate 352D. The plates 352 optionally are mass produced, thereby reducing costs. Such off-the-shelf plate-type heat exchangers 350 can be 3-8 inches in length and are optionally square or rectangular, although other sizes and shapes can be utilized. One or more plate-type heat exchangers 350 can be used in the apparatus either singly or in a series within the tank 106 of system 100.

Figure 4:
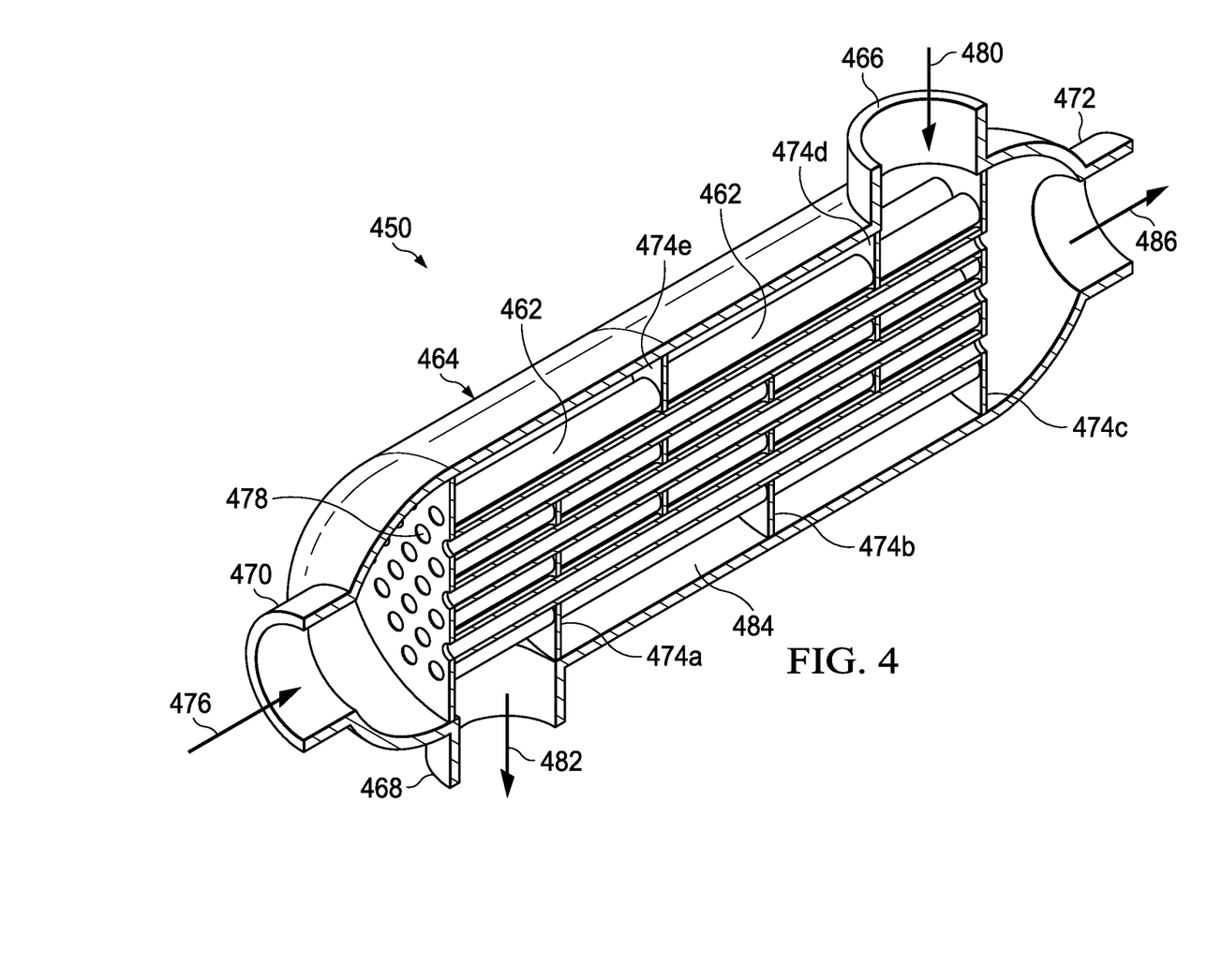
FIG. 4 is a cutaway perspective view of a shell-and-tube-type heat exchanger that may be utilized in the system of FIG. 1 in accordance with certain embodiments.

Another example of a heat exchanger 450 that can be used in the system 100 is shown in FIG. 4. This heat exchanger is a shell-and-tube-type heat exchanger 450, which includes a shell 464 and tubes 462. The tubes 462 are in communication with a first inlet 470 with entry path 476 and a first outlet 472 with exit path 486. The shell 464 is in communication with a second inlet 466 with inlet path 480 and a second outlet with outlet path 482. Hot fluid flow (e.g., from the output path 112) is directed along inlet path 476 through the entries 478 of the tubes 462, while a cool fluid flow entering the second inlet 466 (e.g., from the supply path 110) is directed via 480 along a different path through the shell 464 (e.g., across the tubes 462) to facilitate heat transfer between the hot flow in the tubes 462 and the cool flow in the shell 464.

This heat transfer causes the cool fluid entering the shell (e.g., at the cool inlet 466) to exit the shell 464 via fluid pathway 482 at an increased, "near hot" temperature (e.g., through the near hot outlet 468), and hot fluid entering the tubes 462 (e.g., at the hot inlet 470) to exit via fluid pathway 486 at a decreased, warm temperature (e.g., at the warm outlet 472). Additionally, in the heat exchanger 450 shown in FIG. 4, baffles 474A-474E are included in the shell 464 to provide a tortuous or winding path of the flow of cool fluid from the cool inlet 466 across the tubes 462 containing the hot fluid that entered from the hot inlet 470, such as to prolong travel time through the shell interior space 484 and to ensure heat transfer. One or more shell-and-tube-type heat exchangers 450 can be used in the apparatus either singly or in a series within the tank 106 of system 100.

In practice, a plate-type heat exchanger 350, as shown in FIG. 3, typically has smaller holes, passages or orifices therein in comparison to a shell-and-tube-type heat exchanger 450, as shown in FIG. 4. Accordingly, shell-and-tube-type heat exchangers 450 may be preferable in situations where particulates within the fluid routed through the system 100 are of a size that risk being captured in or clogging the smaller orifices in the plate-type heat exchangers 350. In other aspects, a plate-type heat exchanger 350 may be preferred due to larger surface areas provided within the plate-type heat exchanger 350 for transferring of heat within a given volume. Preferably, two to twenty heat exchangers can be coupled together, with the preferred range of 2 to 12 heat exchangers being coupled together in the vessel.

Figure 5:
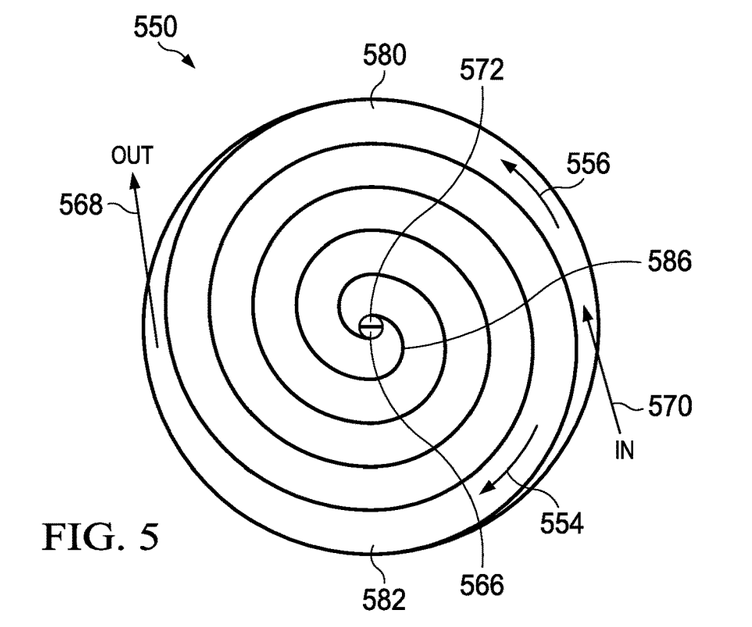
FIG. 5 is a schematic view of a spiral-type heat exchanger that may be utilized in the system of FIG. 1 in accordance with certain embodiments.

FIG. 5 illustrates another example of a heat exchanger 550 that can be used in the system 100. This example is a spiral-type heat exchanger 550, which includes nested spiraling paths 580 and 582. In an illustrative example, a flow of hot fluid 556 (e.g., from the output path 112) is directed through a first spiral cooling path 580, while a flow of cool fluid 554 (e.g., from the supply path 110) is directed along a second spiral warming path 582. Heat transfer occurs across walls 586 separating the nested first spiral cooling path 580 and second spiral warming path 582.

This transfer causes cool fluid 554 entering the second spiral warming path 582 (e.g., in a conduit routed into or out of the page at cool fluid entry conduit 566) to exit the second spiral warming path 582 at an increased temperature (e.g., at warmed fluid exit 568), and hot fluid 556 entering the first spiral cooling path 580 (e.g., at hot fluid entry 570) to exit at a decreased, warm temperature (e.g., in a conduit routed into or out of the plane of the page at cooled fluid exit conduit 572). However, the direction of flow of fluids is optionally different than that described herein. Additionally, although the heat exchanger 550 is shown in a circular shape in FIG. 5, various other shapes could be used, including, but not limited to square, rectangular, oval, or polygonal. One or more spiral-type heat exchangers 550 can be used in the apparatus either singly or in a series within the tank 106 of system 100.

Figure 6:
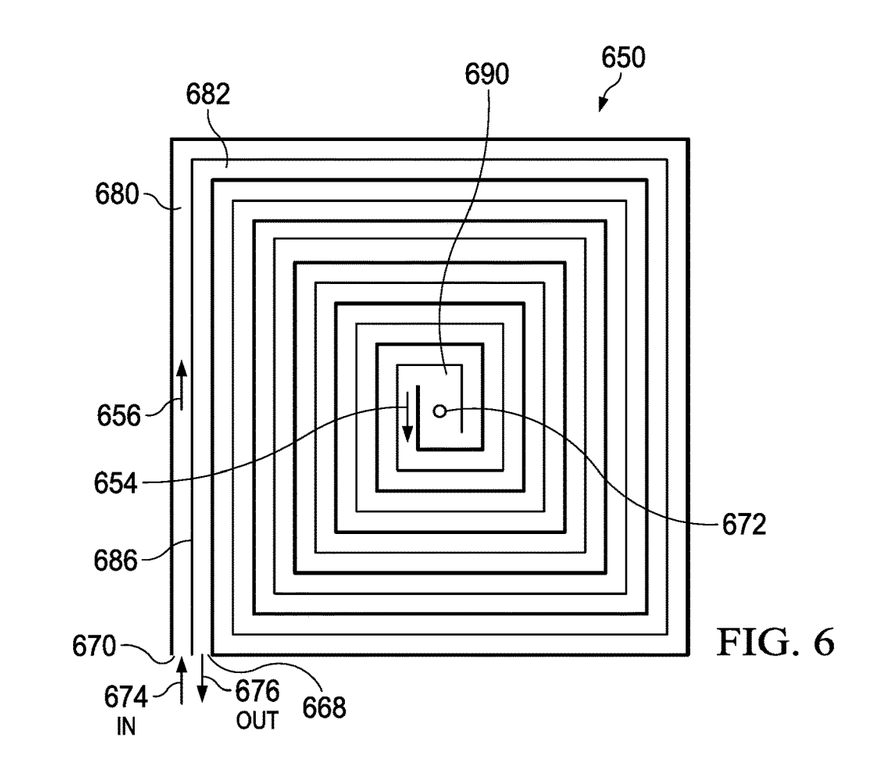
FIG. 6 is a schematic view of another spiral-type heat exchanger that may be utilized in the system of FIG. 1 in accordance with certain embodiments.

FIG. 6 illustrates another example of a heat exchanger 650 that can be used in the system 100. This example is another spiral-type heat exchanger 650 that functions in a slightly different manner from the spiral-type heat exchanger in FIG. 5. The heat exchanger 650 includes nested spiraling paths 680 and 682. In the illustrated embodiment, the nested first spiral warming path 680 and second spiral cooling path 682 transition from one to another in a transition zone 690 located near the center of the illustrated heat exchanger. The transition zone 690 may correspond to the reactor 102 of FIG. 1. The reactor preferably used with the present invention is a full-scale production reactor that can produce commercially available quantities of $H_2$ and $CO_2$ gases for use in industrial production of energy.

The transition zone 690 is illustrated in communication with a conduit 672 routed into or out of the plane of the page. The conduit 672 may correspond to the oxygen path 124 of FIG. 1, for example, such that biomass or $H_2$ in the fluid entering the transition zone 690 undergoes a chemical reaction (e.g., in response to the oxygen provided via the conduit 672) and causes the fluid to exit the transition zone 690 at an increased temperature. Thus, in an illustrative example, a flow of hot or warm fluid 654 (e.g., corresponding to the output path 112) is directed away from transition zone 690 (e.g., at an elevated temperature from having just undergone a chemical reaction therein) through the second spiral cooling path 682.

Additionally, a flow of cool fluid 656 (e.g., from the supply path 110) is directed through inflow path 674 of cool fluid inlet 670 along the first spiral warming path 680. Heat transfer occurs across walls 686 separating the nested first spiral warming path 680 and second spiral cooling path 682. This heat transfer causes cool fluid flow 656 entering the first spiral warming path 680 through cool fluid inlet 670 to increase in temperature/gain heat traveling to the transition zone 690, and causes hot fluid flow 654 entering the second spiral cooling path 682 from the transition zone 690 to exit at outflow path 676 of cooled fluid outlet 668 at a decreased, cooler temperature.

The incoming cool fluid flow 656 gains heat as the flow spirals toward the center where the reaction with the injected $O_2$ occurs. This can create hot product fluid that spirals back out, leaving the warm fluid exiting spiral cooling path 682 at outlet 668 at a slightly higher temperature than the cool fluid flow 656 entering at the cool fluid inlet 670. In this way, heat discharged from fluid exiting the transition zone 690 is used (e.g., recycled) to heat fluid en route to the transition zone 690, which may reduce a total amount of energy needed to bring the incoming fluid to suitable temperatures for initiating chemical reactions. Additionally, although the heat exchanger 650 is shown in a square shape in FIG. 6, various other shapes could be used, including, but not limited to rectangular, circular, oval, or polygonal. One or more spiral-type heat exchangers 650 can be used in the apparatus either singly or in a series within the tank 106 of system 100.

Additional components can also be used in the system 100. For example, thermocouples and computer data acquisition components are optionally included for purposes of testing, monitoring, controlling, etc. Related diagnostics tools used for the measurements include, for example, gas chromatography with flame ionization detection (GC/FID) for detection of unconverted hydrocarbons, GC with thermal conductivity detection for CO, $CO_2$ and $H_2$, as well as molecular beam time-of-flight mass spectrometry for detection of all intermediates. Additional components may include those components needed for additional purification (e.g., distillation/dehydration columns, filtration devices, and the like). CO in the reaction is converted to $CO_2$ and more $H_2$ via a water-gas shift reaction.

In nearly all known previous research regarding SCWG, the chemical reactions are assumed to occur rapidly and thus one invokes "equilibrium" for the product distribution of the output. It is desirable to improve upon the equilibrium assumption by exploring lower reaction temperatures where reactions rates are slow enough that finite rate chemical kinetics become apparent. These finite rates interplay with the residence time in the reactor; the ratio of reaction time over residence time is the Damkohler number (Da). For equilibrium flows, Da is very large. Experimentation related to systems disclosed herein may explore Da approaching 1 and less. Background knowledge in gas phase combustion is used to construct rudimentary models of combustion in high pressure and at high water (or steam) temperatures. Numerical modeling of the reactor can be done in parallel.

Components of one exemplary apparatus of method can be combined or excluded to form other apparatuses or methods not specifically shown. Other changes and modifications, additions and deletions may be made to the structures and methods recited above and shown in the drawings without departing from the scope or spirit of the disclosure or the following claims.

What is claimed is:

1. An apparatus for supercritical water gasification, the apparatus comprising:
   a pressure vessel having a wall separating an interior of the pressure vessel and an exterior of the pressure vessel;
   a reactor positioned within the interior of the pressure vessel, wherein the reactor is configured for supercritical water gasification of mixed reactants to yield products;

an inlet routed through the wall of the pressure vessel to supply a buffer gas to the interior of the pressure vessel, but outside the reactor;

a supply pipe routed through the wall of the pressure vessel and extending to and entering the reactor for providing the mixed reactants to the reactor, from the exterior of the pressure vessel;

an output pipe routed from the reactor and through the wall of the pressure vessel for providing products of super-critical water gasification from the reactor to the exterior of the pressure vessel; and one or more heat exchangers located within the interior of the pressure vessel and fluidly connected to the supply pipe and to the output pipe, the one or more heat exchangers arranged and configured for transferring heat to the mixed reactants in the supply pipe from the products in the output pipe, whereby the heat is recycled from the products and supplied to the mixed reactants en route to the reactor for super-critical water gasification processes, the apparatus configured to allow high temperature control to be decoupled from high pressure containment control, wherein the supply pipe, the output pipe and the one or more exchangers are configured to confine the mixed reactants and the products away from a space defined by the wall of the pressure vessel and a wall of the reactor so that only the buffer gas fills the space.

2. The apparatus of claim 1, further comprising:
insulation positioned within the pressure vessel and outside the reactor, the insulation capable of maintaining an exterior of the pressure vessel at or near room temperature.

3. The apparatus of claim 1, further comprising:
a reactant pump located along the supply pipe capable of increasing pressure of the reactants in the supply pipe from a pressure of 1 bar up to a pressure equal to or more than 220 bars.

4. The apparatus of claim 1, wherein the buffer gas is a pressurized buffer gas.

5. The apparatus of claim 1, further comprising:
an inlet routed through the wall of the pressure vessel to supply pressurized oxygen or air to the reactor inside the pressure vessel.

6. The apparatus of claim 1, further comprising:
a plurality of reactors, heat exchangers or both reactors and heat exchangers positioned in parallel with one another.

7. The apparatus of claim 6, wherein the heat exchangers are plate-type heat exchangers, shell-and-tube-type heat exchangers, or spiral-type heat exchangers, or combinations thereof.

8. The apparatus of claim 1, wherein the reactor is a commercial-sized reactor capable of producing industrial amounts of $H_2$ and $CO_2$ gases.

9. The apparatus of claim 1, the pressure vessel further comprising a moveable flange in the vessel wall that provides access to the pressure vessel interior.

10. An apparatus for supercritical water gasification, the apparatus comprising:
a pressure vessel having a wall separating an interior of the pressure vessel and an exterior of the pressure vessel;

a reactor positioned within the interior of the pressure vessel, wherein the reactor is configured for super-critical water gasification of mixed reactants to yield products;

an inlet routed through the wall of the pressure vessel to supply a buffer gas to the interior of the pressure vessel, but outside the reactor;

a supply pipe routed through the wall of the pressure vessel and extending to and entering the reactor for providing the mixed reactants to the reactor, from the exterior of the pressure vessel;

an output pipe routed from the reactor and through the wall of the pressure vessel for providing products of super-critical water gasification from the reactor to the exterior of the pressure vessel; and one or more heat exchangers located within the interior of the pressure vessel, the one or more heat exchangers fluidly connected to the supply pipe and the output pipe and arranged and configured for transferring heat to the mixed reactants in the supply pipe from the products in the output pipe, wherein the supply pipe, the output pipe and the one or more exchangers are configured to confine the mixed reactants and the products away from a space defined by the wall of the pressure vessel and a wall of the reactor so that only the buffer gas fills the space.

11. The apparatus of claim 10, further comprising:
insulation positioned within the pressure vessel and outside the reactor, the insulation capable of maintaining an exterior of the pressure vessel at or near room temperature.

12. The apparatus of claim 10, wherein the buffer gas is a pressurized buffer gas.

13. The apparatus of claim 10, further comprising:
an inlet routed through the wall of the pressure vessel to supply pressurized oxygen or air to the reactor inside the pressure vessel.

14. The apparatus of claim 10, the pressure vessel further comprising a moveable flange in the vessel wall that provides access to the pressure vessel interior.

* * * * *